United States Patent [19]
Chang et al.

[11] Patent Number: 5,906,506
[45] Date of Patent: May 25, 1999

[54] MODULARIZED COMPUTER PERIPHERALS FORMED WITH UNIVERSALLY ADAPTABLE SHAPE FOR INTEGRATION AS AN UNIT-BODY WITH A PORTABLE COMPUTER

[75] Inventors: Chien-Chung Chang, Tao Yuan County; Yi-Sheng Liu, Tau Yuan, both of Taiwan

[73] Assignee: Delta Electronics, Inc., Taipei, Turkey

[21] Appl. No.: 08/928,309

[22] Filed: Sep. 12, 1997

Related U.S. Application Data

[62] Division of application No. 08/514,756, Aug. 14, 1995, abandoned.

[51] Int. Cl.$^6$ ............................................. H01R 3/00
[52] U.S. Cl. ................................. 439/500; 439/501
[58] Field of Search ............................. 439/500, 501, 439/651, 638, 956, 218, 76.1; 363/146; 307/149–151

[56] References Cited

U.S. PATENT DOCUMENTS

| | | | |
|---|---|---|---|
| 4,847,513 | 7/1989 | Katz et al. | 307/149 |
| 5,058,045 | 10/1991 | Ma | 439/500 |
| 5,457,600 | 10/1995 | Campbell et al. | 439/501 |
| 5,483,437 | 1/1996 | Tang | 363/146 |
| 5,567,176 | 10/1996 | Chiou | 439/500 |

*Primary Examiner*—Gary Paumen
*Assistant Examiner*—Brian J. Biggi
*Attorney, Agent, or Firm*—Bo-In Lin

[57] ABSTRACT

A new and improved AC-to-DC adapter for providing DC input to a portable computer which is operable with a removable rechargeable battery is disclosed in this invention. The adapter is enclosed in an adapter box which is formed with a shape identical to the rechargeable battery. The adapter can therefore be fitted into the pocket made for the rechargeable battery to replace the rechargeable battery when AC power source is available.

7 Claims, 6 Drawing Sheets

MODULARIZED COMPUTER PERIPHERALS FORMED WITH UNIVERSALLY ADAPTABLE SHAPE FOR INTEGRATION AS AN UNIT-BODY WITH A PORTABLE COMPUTER

This application is a divisional of Ser. No. 08/514,756 filed Aug. 14, 1995, now abandoned.

BACKGROUND OF THE INVENTION

1. Field of the Invention

This invention relates generally to a power supply adapter for a portable computer. More particularly, this invention relates to a one-body integratable plugging-in type of AC-to-DC adapter for portable computer wherein one of the preferred embodiment is a battery shaped plug-in adapter for saving of space and convenience of use.

2. Description of the Prior Art

For a portable computer, e.g., a notebook computer or a palm-top computer, the requirement to carry a separate AC-to-DC adapter with its long electrical cords often becomes a nuisance. FIG. 1 shows a notebook computer 10 with a conventional AC-to-DC adapter 20 with a connecting cord 25 and a plug-in jack 30 for plugging into a external power receptor 40 on the notebook computer 10 and an AC outlet plug 35 for plugging in an external AC outlet. The conventional adapter 20 with the electrical cord 25 connected on both ends occupy more space when connected to an external AC outlet. A user also has to manage the electrical cords in order to avoid entanglement during operation and in packaging and carrying the notebook system. The adapter 20 when employed with the portable computer 10 causes inconveniences and requires more space thus limiting the usefulness of such system when the working space is limited as in many modern offices and in the 'mobile or portable office', e.g., on a van or in the field where the work has to be performed on-site with the portable computers.

Therefore, there is still a need for a new AC-to-DC adapter design and configuration in the art of adapter for portable computer in order to resolve these difficulties and limitations. Specifically, this new adapter design and configuration must be able to provide space savings and operation conveniences to satisfy modern portable and mobile operational requirements for micro-computers.

SUMMARY OF THE PRESENT INVENTION

It is therefore an object of the present invention to provide a new AC-to-DC adapter design and configuration which can achieve space savings and operational conveniences in order to overcome the aforementioned difficulties encountered in the prior art.

Specifically, it is an object of the present invention to provide a new AC-to-DC adapter design and configuration wherein the adapter can be conveniently integrated as an unit-body into the portable computer to achieve space saving and operational conveniences.

Another object of the present invention is to provide a new AC-to-DC adapter design and configuration wherein the unit-body integratable adapter for the portable computer also provides battery charging connecting means to charge the battery for the portable computer.

Another object of the present invention is to provide a new AC-to-DC adapter design and configuration with an AC input plug such that the electrical cords for connecting to the external AC outlet can be handled independently of the adapter such that the electrical cord entanglement may be reduced.

Another object of the present invention is to provide a new AC-to-DC adapter design and configuration which provides a wire collector box to collect electrical wires and cords therein when the adapter is integrated into the portable computer as an unit body device such that the requirement of separately handling easily entangled wires and cords may be eliminated.

Another object of the present invention is to provide computer peripherals which are formed with universally adaptable shape such that each of these peripherals may be integrated with the portable computer as a unit body portable device whereby such device may be conveniently carried.

Briefly, in a preferred embodiment, the present invention comprises an AC-to-DC adapter for providing DC input to a portable computer operable with a rechargeable battery. The adapter comprises a plurality of circuits for converting an AC input voltage to a DC output voltage suitable for operating the portable computer. The adapter also includes a containing means for containing and protecting the circuits therein. The containing means is designed and manufactured to be of identical shape as the battery whereby the adapter may be integrated into the portable computer as a unit-body like the battery. In another preferred embodiment the adapter further includes an AC input plug for receiving and AC input from a connecting means to an AC power source whereby the connecting means to an AC power source may be handled independently from the adapter. In another preferred embodiment the adapter further includes a charging connecting outlet for connecting to a charging wire which in turn being connected to the portable computer for charging the battery.

It is an advantage of the present invention that it provides a new AC-to-DC adapter design and configuration wherein the adapter can be conveniently integrated as an unit-body into the portable computer to achieve space saving and operational conveniences.

Another advantage of the present invention is that it provides a new AC-to-DC adapter design and configuration wherein the unit-body integratable adapter for the portable computer also provides battery charging connecting means to charge the battery for the portable computer.

Another advantage of the present invention is that it provides a new AC-to-DC adapter design and configuration with an AC input plug such that the electrical cords for connecting to the external AC outlet can be handled independently of the adapter such that the electrical cord entanglement may be reduced.

Another advantage of the present invention is that it provides a new AC-to-DC adapter design and configuration which provides wire collector box to collect electrical wires and cords therein when the adapter is integrated into the portable computer as an unit body device such that the requirement of separately handling easily entangled wires and cords may be eliminated.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
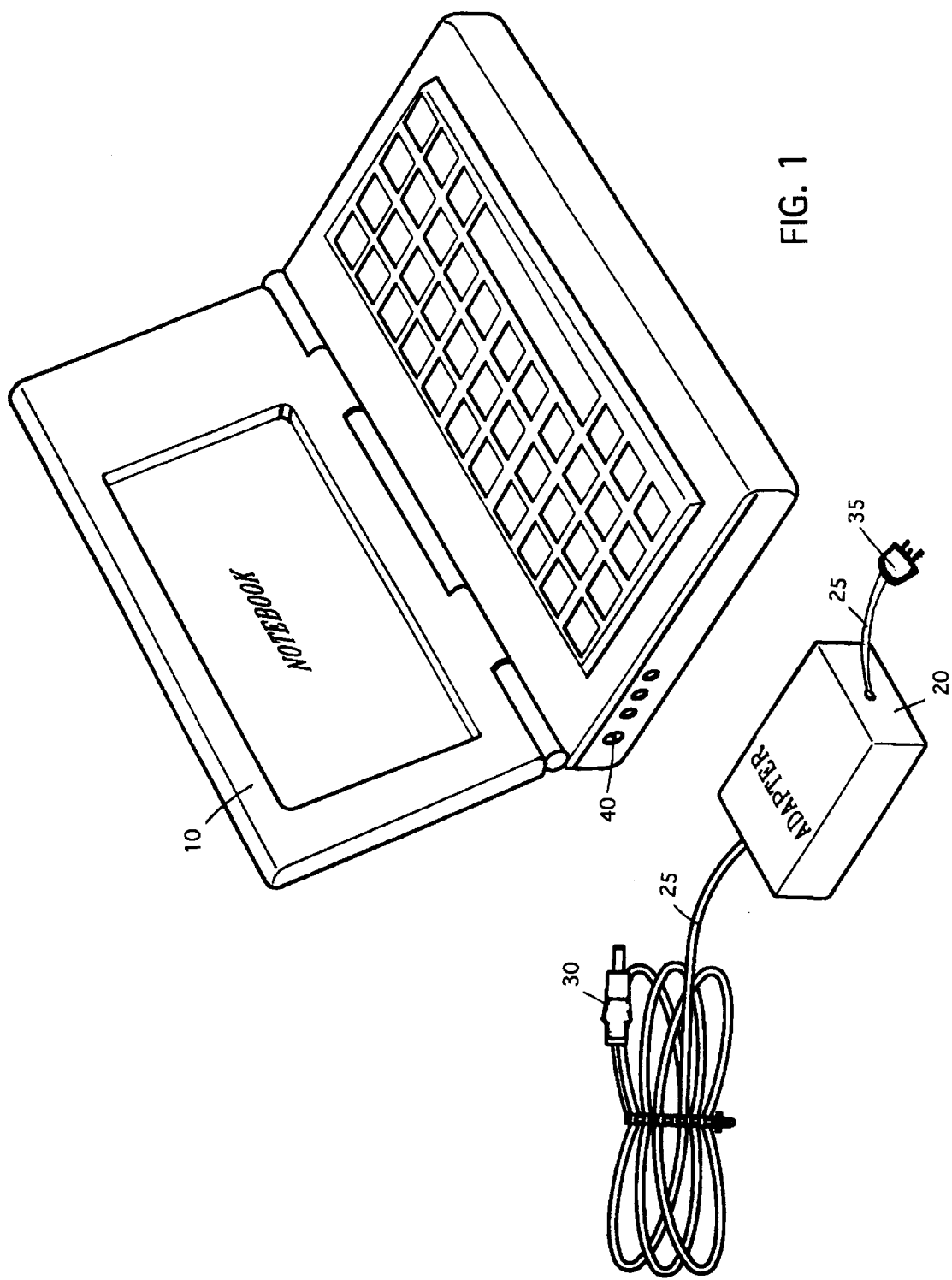
FIG. 1 is a perspective view of a prior art AC-to-DC power adapter employed by a portable computer.
Figure 2:
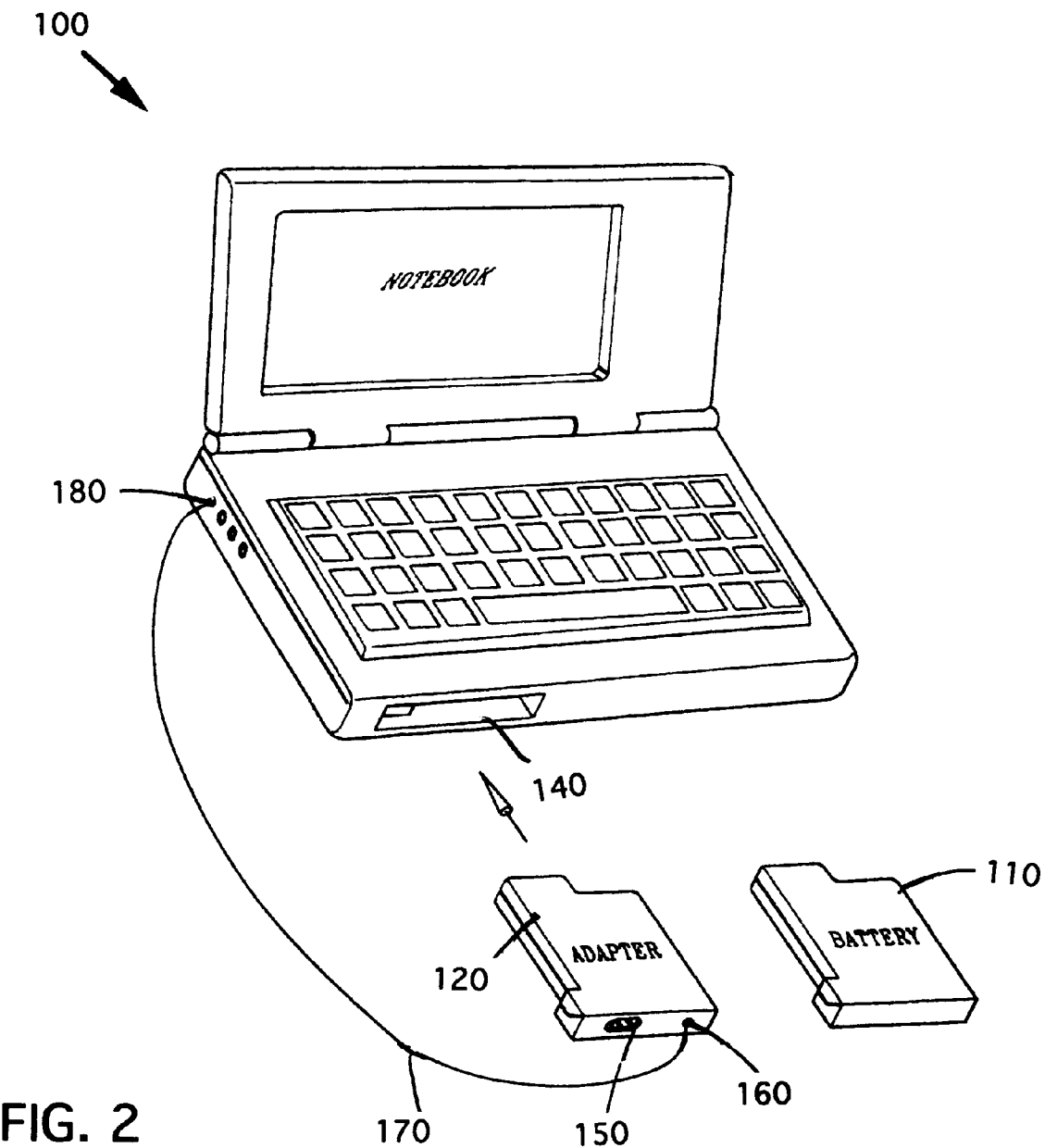
FIG. 2 is a perspective view of an AC-toDC power adapter of the present invention employed by a portable computer.

FIG. 2 shows a perspective view of an AC-to-DC adapter 120 for a portable computer 100 which can also be operated with a rechargeable battery 110. The adapter 120 of the present invention is specially configured to be unit-body integratable with the portable computer 100. Specifically, in this preferred embodiment as shown, the adapter 120 is designed and manufactured to be of identical shape with the rechargeable battery 110. The portable computer 100 has a battery pocket 140 for receiving and connecting to the rechargeable battery 110 for operation by using the electric power provided by the rechargeable battery 110. The adapter 120, when manufactured to have identical shape as the rechargeable battery 120, can also be inserted into the battery pocket 140 and integrated with the portable computer 100 as one unit-body. The adapter 120 has an input AC plug 150 for plugging into an electrical cord (not shown) which can then be connected to an external AC power outlet to provide AC power input to the adapter 120. The adapter 120 then converts the AC power input to a DC power input for operating the portable computer 100.

Figure 3:
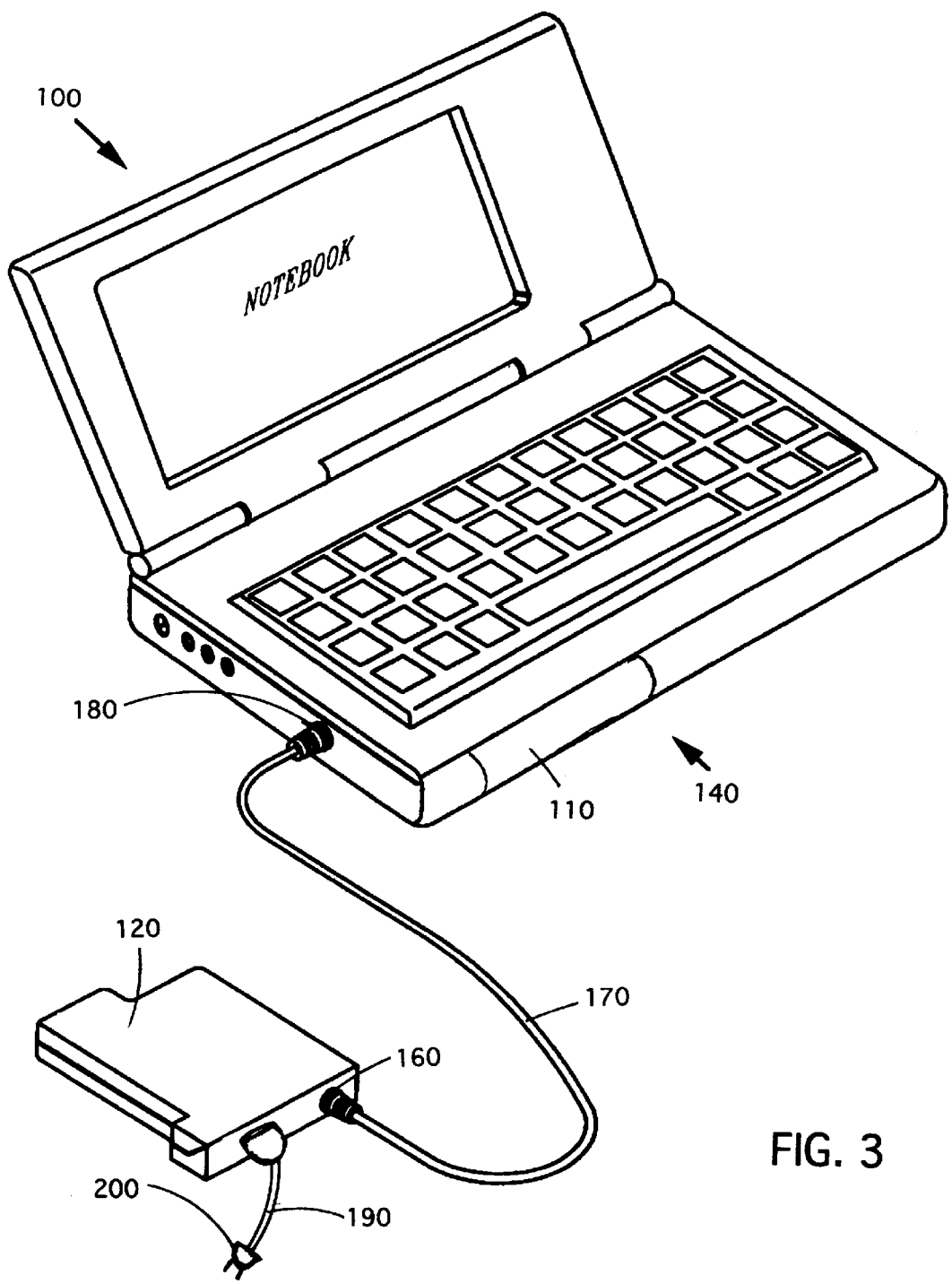
FIG. 3 is a perspective view of an AC-to-DC power adapter of the present invention employed by a portable computer for charging the battery.

The adapter 120 further has a charging connecting outlet 160. A configuration for charging the rechargeable battery 110 by the use of the adapter 120 and the portable computer 100 is shown in FIG. 3. The rechargeable battery 110 is now inserted into the battery pocket 140 of the portable computer 100. A charging wire 170 is now connected between the charging connecting outlet 160 on the adapter 120 to a charging input receptor 180 on the portable computer 100. The rechargeable battery 110 is being charged with the AC power input received by the adapter 120 from an external AC outlet 200 via an AC power cord 190.

Figure 4:
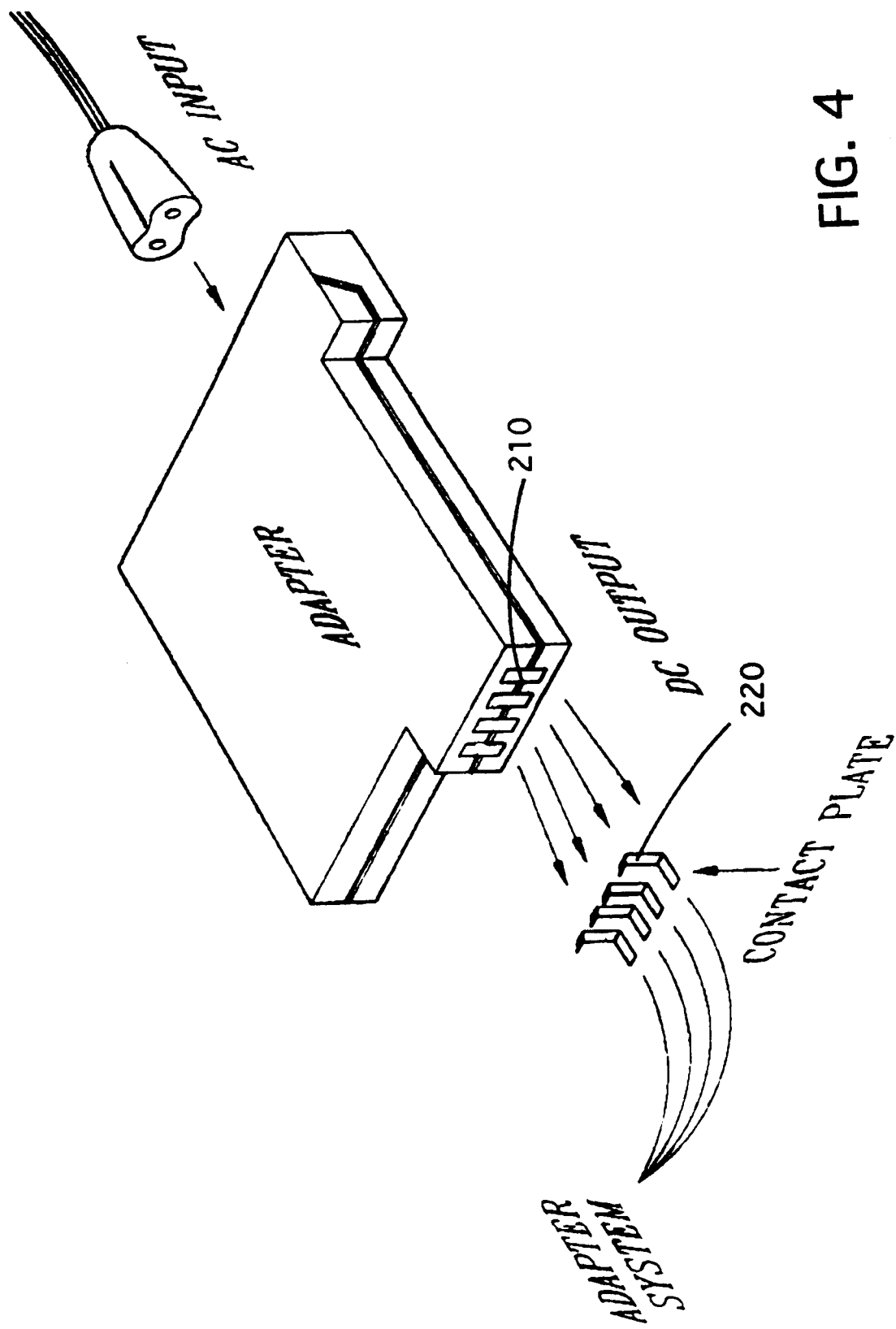
FIG. 4 is a perspective view showing the contact configuration arrangement of the adapter and the portable computer for providing DC input for operating the computer and for charging the battery.

FIG. 4 shows the configuration of the contact arrangement inside the battery pocket 140 of the portable computer 100 for allowing the adapter to (1) provide the DC power while inserting into the pocket 140 and (2) charge the battery 110 when the battery 110 is inserted in the pocket 140 and the adapter is connected to an AC power outlet 200 and also connected to the portable computer 100 via the charging wire 170 to the charging input receptor 180. The power adapter 120 includes four contact plates 210 very similar to that provided in the battery pack 110 for providing DC output to the notebook computer 100. The notebook computer 100 has four corresponding contact plates 220 for direct contact with the four contact plates 210 on the adapter 120 for receiving input DC current from the adapter 120 for operating the notebook computer 100 when the adapter is placed in the battery pocket 140. The details of the circuit of the adapter 120 including an AC-to-DC conversion circuit for providing DC current to the four contact plates 210 are similar to any conventional AC-to-DC converter which is well known in the art and need not be further discussed in this application.

Figure 5A:
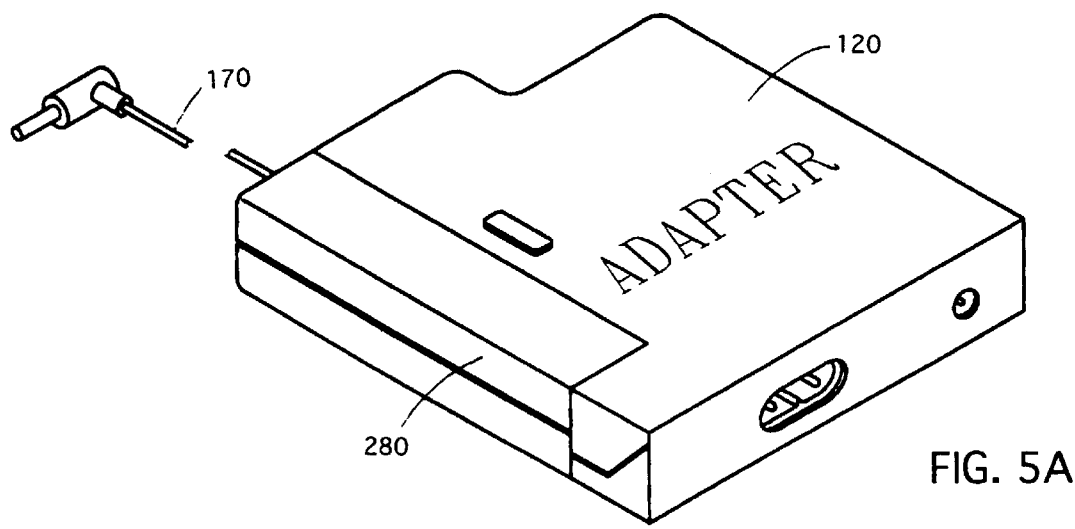
FIGS. 5A to 5C are perspective views of the adapter of the present invention which further includes a wire collector.
Figure 5B:
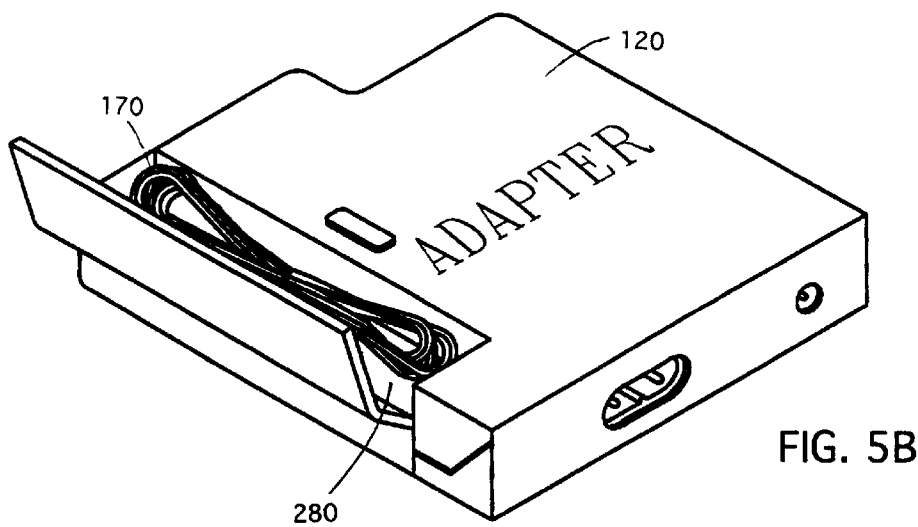
Figure 5C:
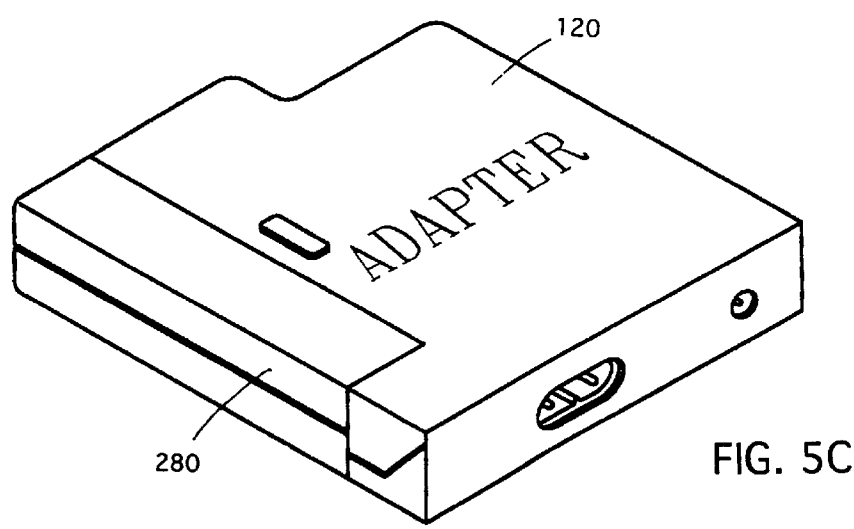

FIGS. 5A to 5C show another preferred embodiment of the present invention. The adapter 120 which is fabricated with a shape identical to that of a rechargeable battery 110 is now provided with a wire collector compartment 280. FIG. 5A shows the use of the DC wire 170 to connect the adapter 120 to the notebook computer 100 to charge a rechargeable battery 110 when the rechargeable battery 110 is installed inside the battery pocket 140. FIG. 5B shows that the DC wire 170 can be removed from the adapter 120 and stored in the wire collector compartment 280. FIG. 5C shows the adapter 120 has the DC wire 170 stored in the wire collector compartment 280. The adapter 120 is ready to be inserted into the battery pocket 140 of the notebook computer 100. By the use of this adapter 120, a user is provided with a convenient modularized adapter without requiring to handle the DC wire separately as often required in a conventional notebook computer.

According to the above description, the present invention discloses an AC-to-DC adapter 120 for providing DC input to a portable computer 100 operable with a removable rechargeable battery 110. The adapter 120 includes a plurality of circuits for converting an AC input voltage to a DC output voltage suitable for operating the portable computer 100. The adapter 120 includes an AC input plug 150 for receiving the AC input from a connecting means to an AC power source whereby the connecting means to an AC power source may be handled independently from the adapter. The adapter further includes a containing means, the containing box of the adapter 120, for containing and protecting the circuits therein, the containing means being designed and manufactured to be of identical shape as the rechargeable battery 110 whereby the adapter may be integrated into the portable computer as a unit-body by replacing the removable battery 110. The adapter 120 further has a charging connecting outlet 160 for connecting to a charging wire 170 which in turn being provided for connecting to the portable computer 100 for charging the rechargeable battery 110 in the notebook computer 100. The adapter further includes a wire collector compartment 280 for collecting and storing the charging wire 170 therein.

Figure 6:
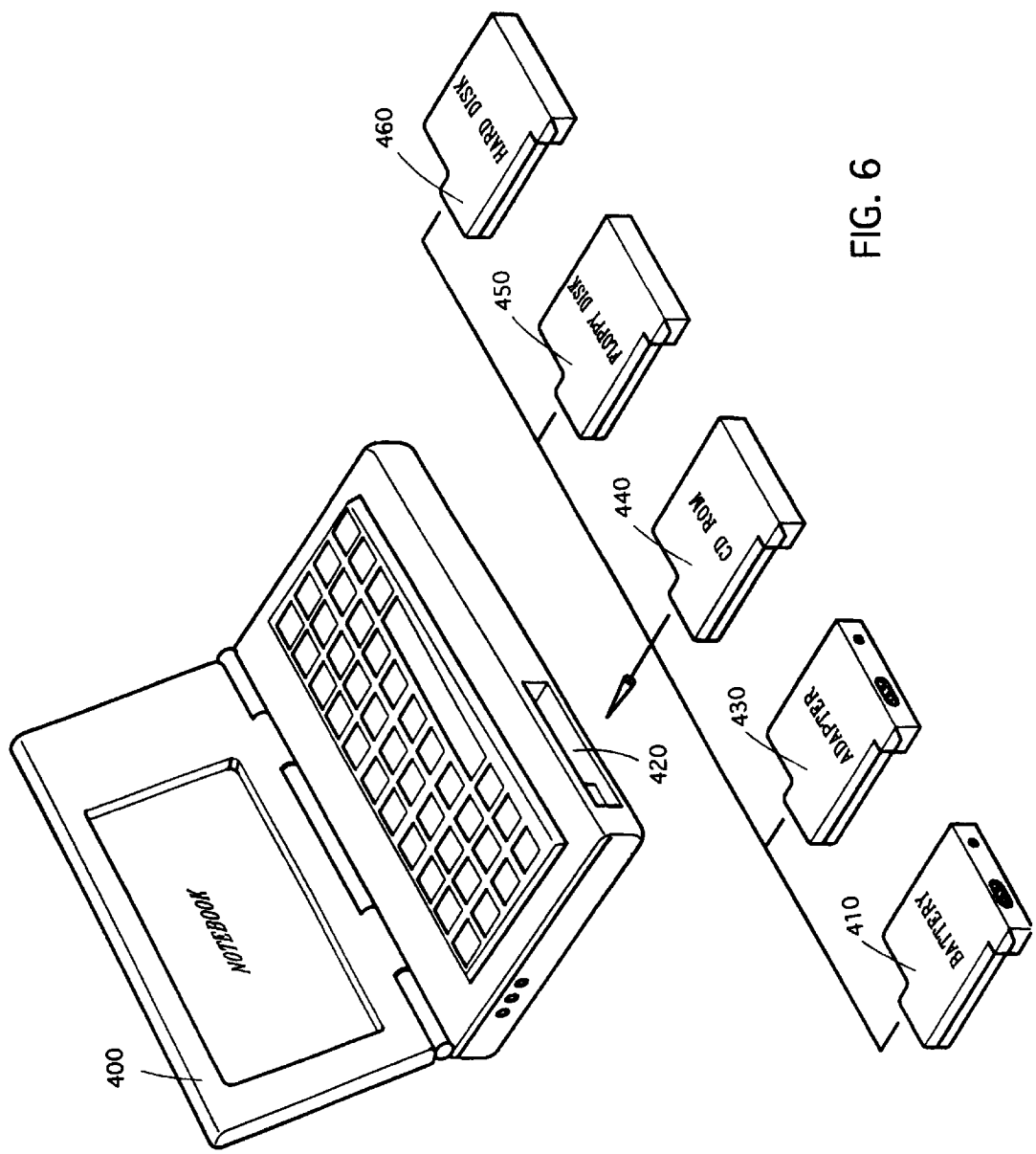
FIG. 6 is a perspective view of modularized computer peripherals which are formed with universally adaptable shape therefore are provided for integration into a portable notebook computer as an unit body device.

FIG. 6 shows another preferred embodiment of the present invention. A notebook computer 400 is provided with a universal adaptable pocket 420. According to the shape of this universal adaptable pocket 420, modularized computer peripherals such as a rechargeable battery 410, an AC-DC adapter 430, a compact disk read only memory (CD ROM) 440, a floppy disk drive 450, and a hard disk drive 460 are formed to have that identical shape. Each of these peripherals can then be inserted into this universal adaptable pocket and configure the notebook according to a user's operational requirements. This modularized method of configuring a notebook computer allows a user to more conveniently bring different types of peripherals depending the types of trips and the available power sources and operational supports a user may need in taking the portable computer on the trips.

The present invention also discloses a notebook computer 400 which is operable with a plurality of peripherals, e.g., CD ROM 440, floppy disk drive 450 hard disk drive 460, adapter 430, and rechargeable battery 410. The notebook computer includes a universal adaptable pocket 420 being formed with a universally adaptable shape. Each of the peripherals of the notebook computer 400, e.g., CD ROM 440, floppy disk drive 450 hard disk drive 460, adapter 430, and rechargeable battery 410, is provided with an adaptable shape for fitting into the pocket 420 with the universally adaptable shape whereby the peripherals may be modularized and flexibly removed and re-installed in the notebook computer 400.

The present invention also teaches a method for providing a notebook computer 400 with modularized peripherals. The method includes the steps of: (a) forming a universal adaptable pocket 420 with a universally adaptable shape; and (b) forming each of the peripherals of the notebook computer, e.g., CD ROM 440, floppy disk drive 450 hard disk drive 460, adapter 430, and rechargeable battery 410, with an adaptable shape for fitting into the pocket 420 with the universally adaptable shape whereby the peripherals may be modularized and flexibly removed and re-installed in the notebook computer 400.

The present invention discloses a new and non-obvious AC-to-DC adapter design and configuration wherein the adapter can be conveniently integrated as an unit-body into the portable computer to achieve space savings and operational conveniences. The unit-body integratable adapter for the portable computer also provides battery charging connecting means to charge the battery for the portable computer. This new AC-to-DC adapter has an AC input plug such that the electrical cords for connecting to the external AC outlet can be handled independently of the adapter such that the electrical cord entanglement may be reduced. Furthermore, this new AC-to-DC adapter also provides a wire collector box for collecting the wire therein for conveniently integrating with a notebook computer as an unit body portable device. The requirement to handle the easily entangled wires and electrical cords are eliminated by the use of this novel adapter.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A total-battery-replacement AC-to-DC adapter for providing DC input to a portable computer operable with a removable rechargeable battery provided for installation in a battery compartment in said portable computer, said adapter comprising:

a plurality of circuits for converting an AC input voltage to a DC output voltage suitable for operating said portable computer;

a containing means for containing and protecting said circuits therein, said containing means being designed and manufactured to fit into said battery compartment as a single total replacement of said removable rechargeable battery thus allowing said portable computer to operate without said rechargeable battery when said AC-to-DC adapter is installed in said battery compartment whereby said portable computer is more conveniently operated in achieving savings of space and preventing said rechargeable battery from extra discharging-and-charging cycles;

a DC output plug provided for connecting to a DC wire when removed from said battery compartment thus provided for serving dual functions in providing a DC power input to said portable computer and providing a second DC power input through said DC output plug and said DC wire when removed from said battery compartment; and said containing means further includes a wire collector compartment constituting a unit body with said containing means for collecting and storing said DC wire therein for total replacement of said rechargeable battery when installed in said battery compartment thus constituting a configuration having a DC wire collected within a wire collector compartment in an AC-to-DC adapter inside said portable computer.

2. The total battery-replacement adapter of claim 1 further comprising:

an AC input plug for receiving said AC input from an AC cable provided for connecting to an AC power source whereby said AC cable may be removed from said AC input plug and handled independently from said adapter.

3. The total battery-replacement adapter of claim 2 further comprising:

said wire collector compartment further includes a means for collecting and storing said AC cable.

4. The adapter of claim 2 further wherein:

said DC wire is removable from said AC-to-DC adapter for storing in said wire collector compartment.

5. A total-battery-replacement AC-to-DC adapter for providing DC input to a portable computer operable with a removable rechargeable battery provided for installation in a battery compartment in said portable computer, said adapter comprising:

a plurality of circuits for converting an AC input voltage to a DC output voltage suitable for operating said portable computer;

an AC input plug for receiving said AC input from an AC cable provided for connecting to an AC power source whereby said AC cable may be removed from said AC input plug and handled independently from said adapter;

a containing means for containing and protecting said circuits therein, said containing means being designed and manufactured to fit into said battery compartment as a single total replacement of said removable rechargeable battery thus allowing said portable computer to operate without said rechargeable battery when said AC-to-DC adapter is installed in said battery compartment whereby said portable computer is more conveniently operated in achieving savings of space and preventing said rechargeable battery from extra discharging-and-charging cycles;

a DC output plug provided for connecting to a DC wire when removed from said battery compartment thus provided for serving dual functions in providing a DC power input to said portable computer and providing a second DC power input through said DC output plug and said DC wire when removed from said battery compartment; and said containing means further includes a wire collector compartment constituting a unit body with said containing means for collecting and storing said DC wire therein for total replacement of said rechargeable battery when installed in said battery compartment thus constituting a configuration having a DC wire collected within a wire collecting compartment in an AC-to-DC adapter inside said portable computer.

6. A notebook computer operable with a plurality of peripherals comprising:

a peripheral adaptable pocket being formed with a peripheral adaptable shape; and each of said peripherals of said notebook computer being formed with said peripheral adaptable shape for fitting into said pocket whereby each of said peripherals is modularized and flexibly removable and re-installable in said notebook computer;

each of said peripheral further includes a DC plug for interconnecting to said notebook computer with a DC wire when removed from said pocket; and each of said peripheral further includes a DC wire collector compartment constituting a unit body with said peripheral for collecting and storing said DC wire therein for installing into said pocket thus constituting a configuration having a DC wire collected within a wire collector compartment in a peripheral inserted inside said notebook computer.

7. A method for providing a notebook computer with modularized peripherals comprising the steps of:

(a) forming a peripheral adaptable pocket with a peripheral adaptable shape; and (b) forming each of said peripherals of said notebook computer with a peripheral adaptable shape for fitting into said pocket whereby each of said peripherals is modularized and flexibly removable and re-installable in said notebook computer;

c) providing to each of said peripheral a DC plug for interconnecting to said notebook computer with a DC wire when removed from said pocket; and d) providing to each of said peripheral a DC wire collector compartment constituting a unit body with said peripheral for collecting and storing said DC wire therein for installing into said pocket thus constituting a configuration having a DC wire collected within a wire collector compartment in a peripheral inserted inside said notebook computer.

* * * * *